United States Patent
Dittrich et al.

(10) Patent No.: US 9,594,683 B2
(45) Date of Patent: Mar. 14, 2017

(54) DATA PROCESSING IN A MULTIPLE PROCESSOR SYSTEM TO MAINTAIN MULTIPLE PROCESSOR CACHE MEMORY ACCESS COHERENCY

(71) Applicant: INTERNATIONAL BUSINESS MACHINES CORPORATION, Armonk, NY (US)

(72) Inventors: Jens Dittrich, Saarbruecken (DE); Christian Jacobi, Poughkeepsie, NY (US); Matthias Pflanz, Boeblingen (DE); Stefan Schuh, Saabruecken (DE); Kai Weber, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 14/543,319

(22) Filed: Nov. 17, 2014

(65) Prior Publication Data
US 2015/0154116 A1 Jun. 4, 2015

(30) Foreign Application Priority Data
Dec. 3, 2013 (GB) .................................. 1321307.9

(51) Int. Cl.
*G06F 12/00* (2006.01)
*G06F 12/08* (2016.01)

(52) U.S. Cl.
CPC ...... *G06F 12/0815* (2013.01); *G06F 12/0862* (2013.01); *G06F 2212/283* (2013.01); *G06F 2212/6022* (2013.01)

(58) Field of Classification Search
CPC ............. G06F 12/0815; G06F 12/0862; G06F 2212/283; G06F 2212/6022
USPC ........................................................ 711/122
See application file for complete search history.

(56) References Cited

U.S. PATENT DOCUMENTS

| | | | | |
|---|---|---|---|---|
| 6,738,872 B2 * | 5/2004 | Van Huben | ............. | G06F 9/524 711/124 |
| 2002/0083299 A1 * | 6/2002 | Van Huben | ....... | G06F 15/17381 712/29 |
| 2009/0198955 A1 | 8/2009 | Arimilli et al. | | |
| 2011/0320730 A1 | 12/2011 | Blake et al. | | |
| 2014/0108742 A1 * | 4/2014 | Boettiger | ............ | G06F 12/0862 711/137 |

FOREIGN PATENT DOCUMENTS

GB 2503437 A 1/2014

OTHER PUBLICATIONS

Search Report for GB1321307.9 dated May 21, 2014, 3 pages.

* cited by examiner

*Primary Examiner* — Mardochee Chery
(74) *Attorney, Agent, or Firm* — Heslin Rothenberg Farley & Mesiti P.C.

(57) ABSTRACT

A data processing system including multiple processors with a hierarchical cache structure comprising multiple levels of cache between the processors and a main memory, wherein at least one page mover is positioned closer to the main memory and is connected to the cache memories of the at least one shared cache level (L2, L3, L4), the main memory and to the multiple processors to move data between the cache memories of the at least one shared cache level, the main memory and the processors. In response to a request from one of the processors, the at least one page mover fetches data of a storage area line-wise from at least one of the following memories: the cache memories and the main memory maintaining multiple processor cache memory access coherency.

12 Claims, 12 Drawing Sheets

DATA PROCESSING IN A MULTIPLE PROCESSOR SYSTEM TO MAINTAIN MULTIPLE PROCESSOR CACHE MEMORY ACCESS COHERENCY

PRIOR FOREIGN APPLICATION

This application claims priority from United Kingdom patent application number 1321307.9, filed Dec. 3, 2013, which is hereby incorporated herein by reference in its entirety.

BACKGROUND

One or more aspects of the present invention relate in general to the field of a multiprocessor system with a hierarchical cache structure, and in particular to a data processing system comprising multiple processors with a hierarchical cache structure comprising multiple levels of cache between the processors and a main memory.

Known data processing systems comprising multiple processors with hierarchical processor caches and a main memory share at least one processor cache between the processors. In such data processing systems the bandwidth between memory and processors is the new bottleneck. To increase the payload the known data processing systems comprise page mover functionality for moving data blocks from one memory location to another memory location without involving the corresponding processor that has initiated the data moving process.

In the Patent Application Publication US 2011/0320730 A1 "NON-BLOCKING DATA MOVE DESIGN" by Blake et al., incorporated by reference herein in its entirety, a mechanism for data buffering is disclosed. A portion of a cache is allocated as buffer regions, and another portion of the cache is designated as random access memory. One of the buffer regions is assigned to a processor. A data block is stored from one of the buffer regions of the cache to the memory.

SUMMARY

In an embodiment of the present invention, a data processing system comprises multiple processors with a hierarchical cache structure comprising multiple levels of cache and a main memory. At least cache memories of one cache level are shared between the processors. Further, at least one page mover is positioned closer to the main memory and connected to the cache memories of the at least one shared cache level, the main memory and to the multiple processors to move data between the cache memories of the at least one shared cache level, the main memory and the processors. In response to a request from one of the processors the at least one page mover fetches data of a storage area line-wise from at least one of the following memories: the cache memories of the at least one shared cache level and the main memory maintaining multiple processor cache memory access coherency; wherein the at least one page mover comprises a data processing engine which performs at least one of the following data processing operations: aggregation and filtering of the fetched data. The page mover moves processed data to at least one of the following components: cache memories of the at least one shared cache level, the main memory and the requesting processor maintaining multiple processor cache memory access coherency.

BRIEF DESCRIPTION OF THE SEVERAL VIEWS OF THE DRAWINGS

Embodiments of the present invention, as described in detail below, are shown in the drawings, in which.

DETAILED DESCRIPTION

Figure 1:
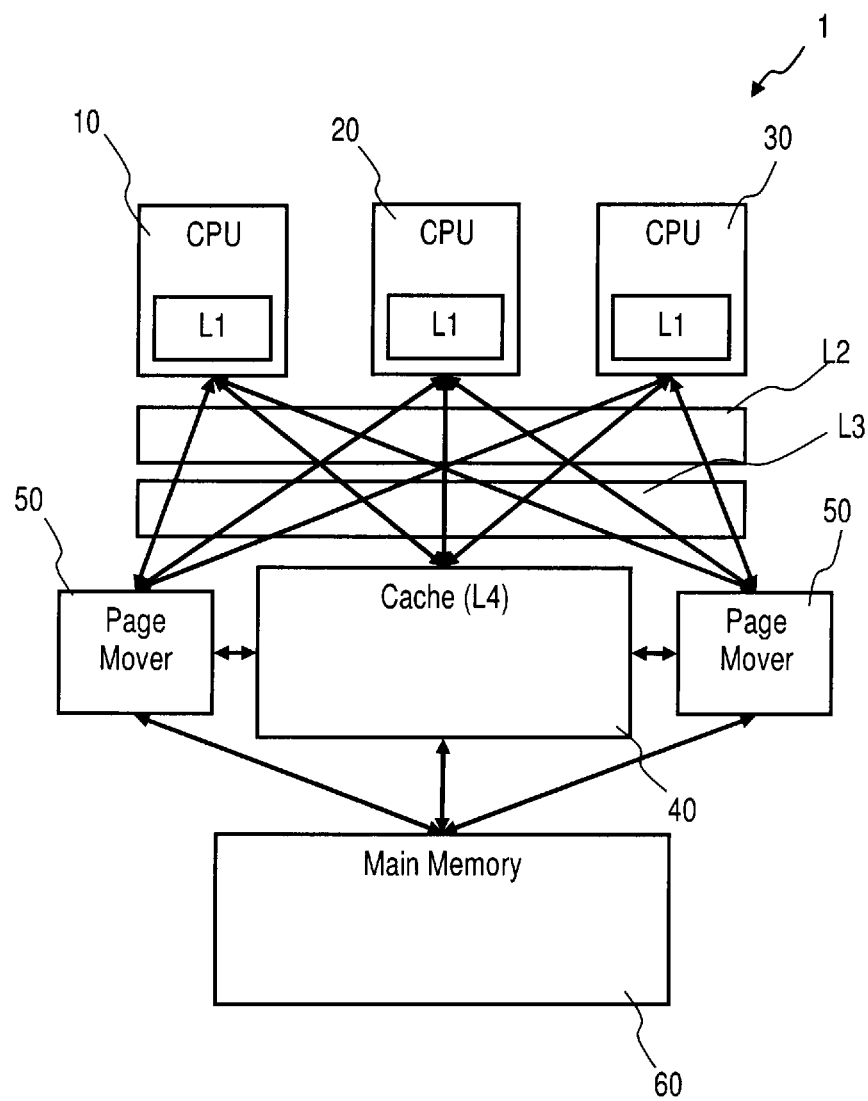
FIG. 1 is a schematic block diagram of a data processing system, in accordance with an embodiment of the present invention.

A technical problem underlying one or more aspects of the present invention is to provide a data processing system, a computer program product and a method for data processing in a multiple processor system, which are able to increase the payload of the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
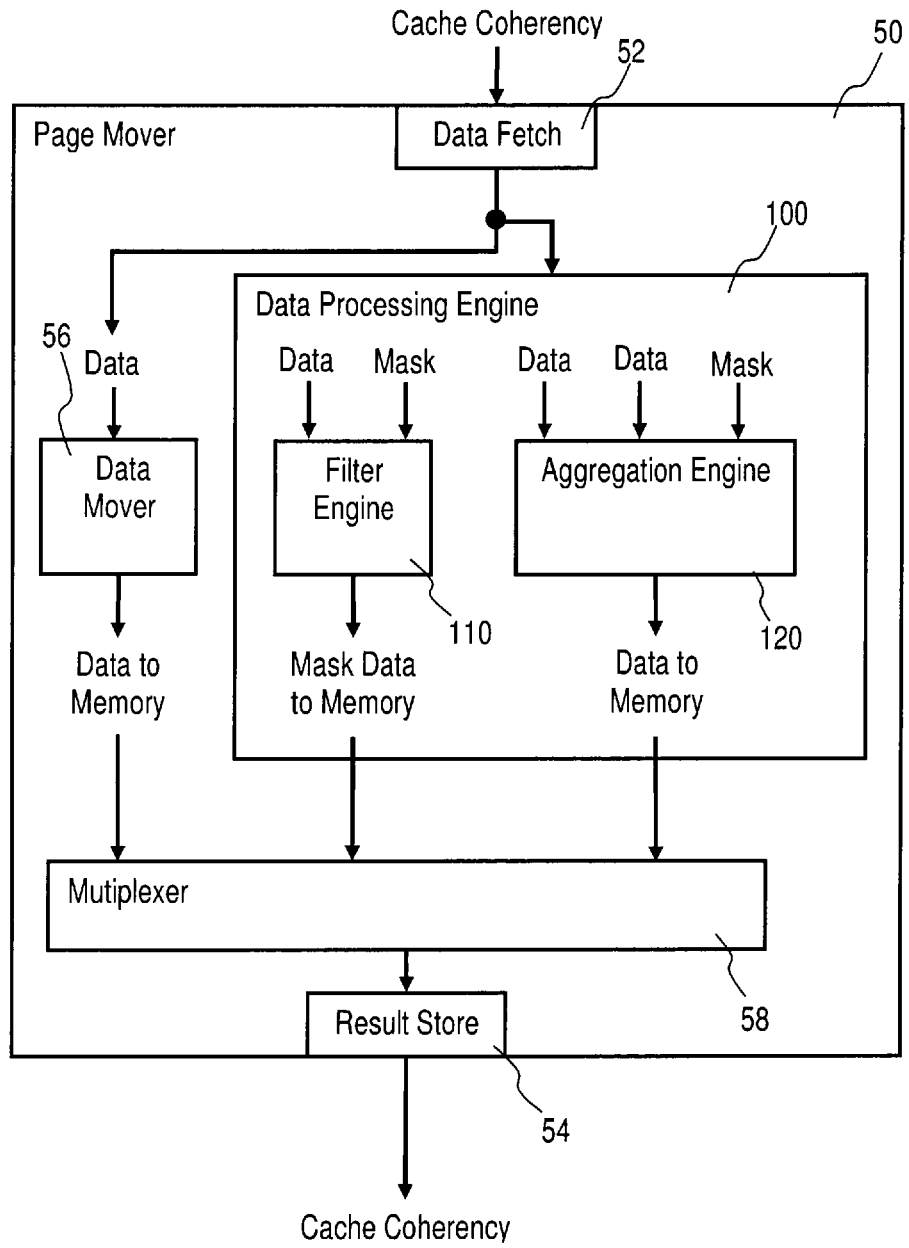
FIG. 2 is a schematic block diagram of a page mover used in the data processing system shown in FIG. 1.
Figure 3:
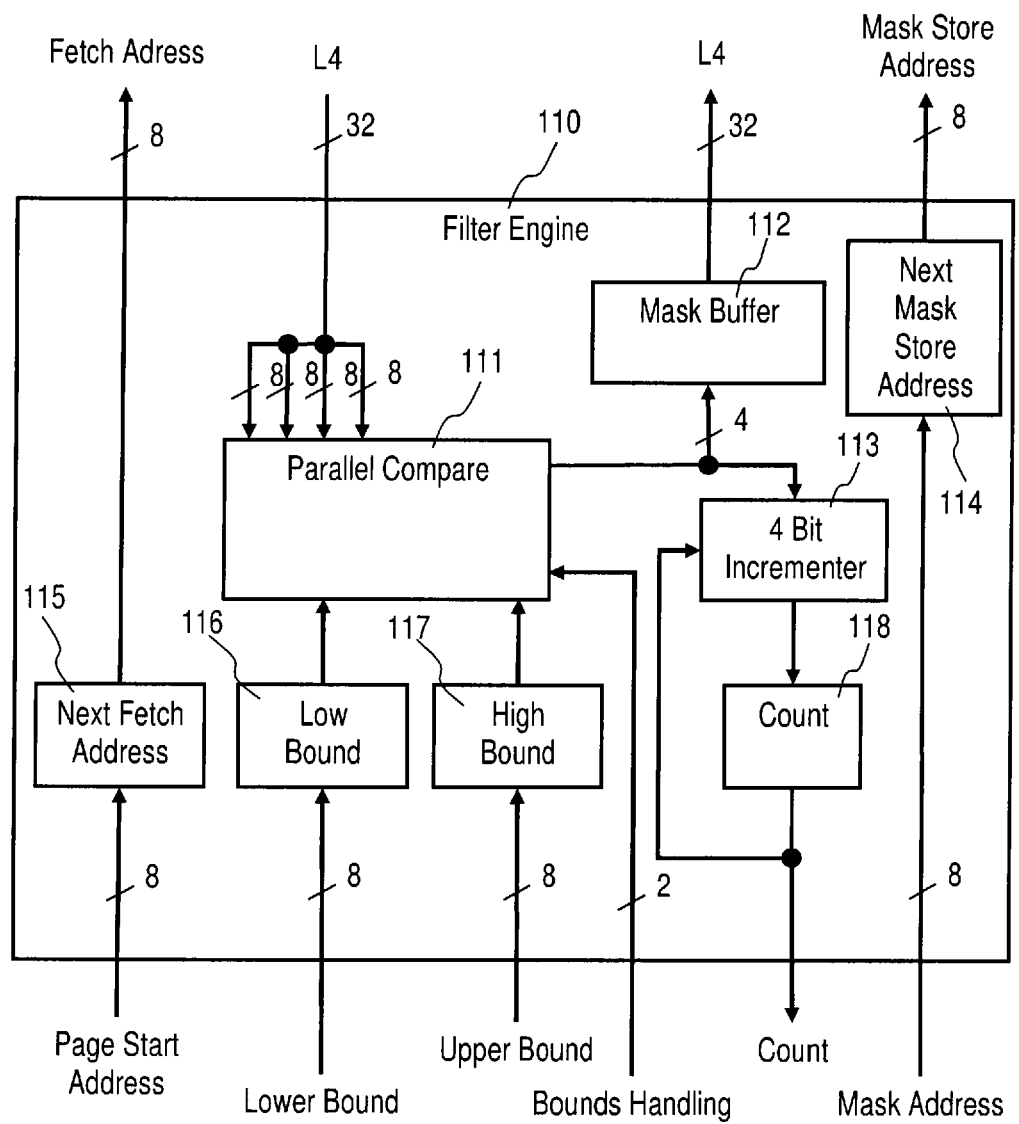
FIG. 3 is a schematic block diagram of a filter engine used in the page mover shown in FIG. 2.
Figure 4:
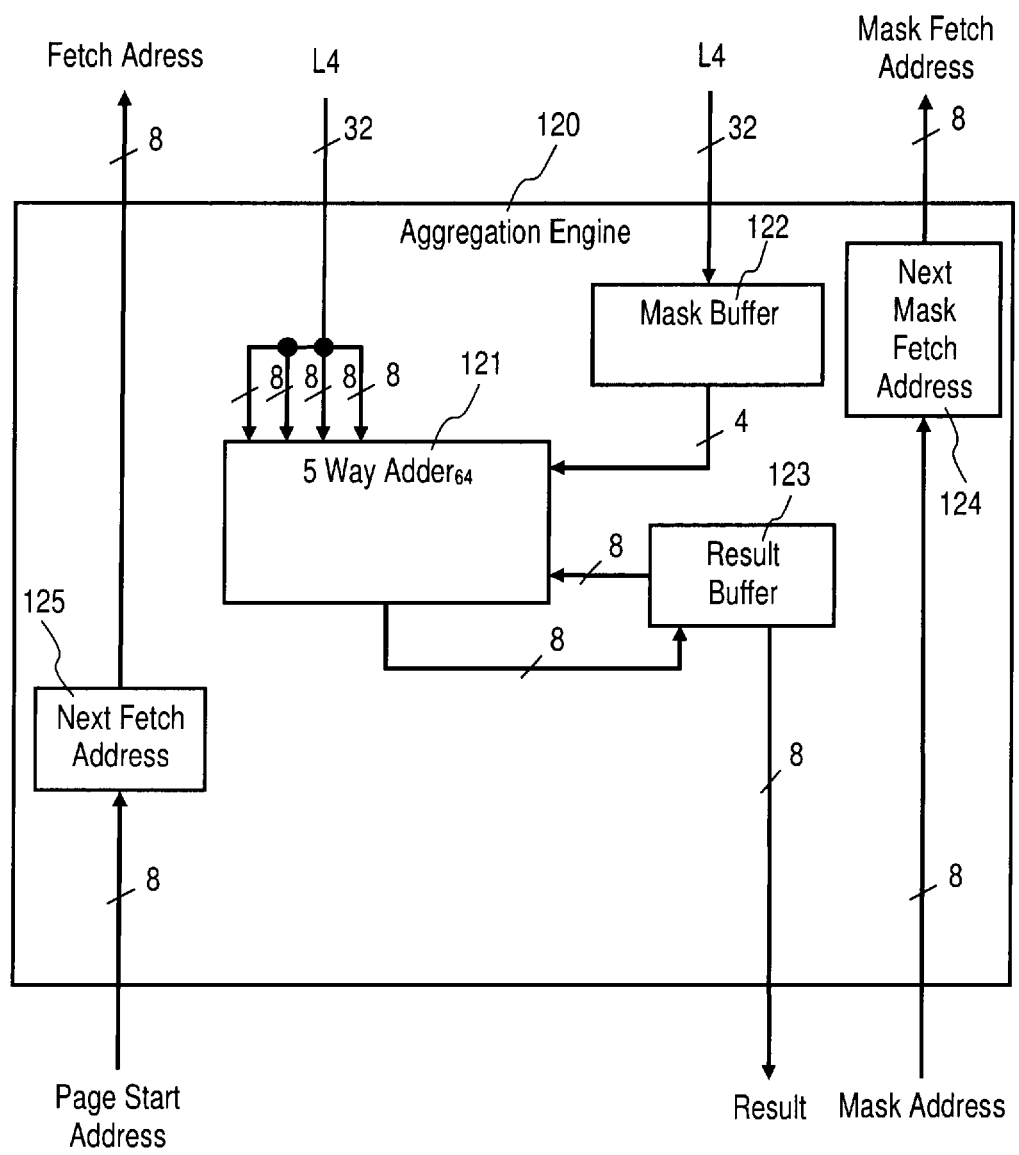
FIG. 4 is a schematic block diagram of an aggregation engine used in the page mover shown in FIG. 2.

FIG. 1 shows a data processing system 1, in accordance with an embodiment of the present invention; FIG. 2 shows a page mover 50 used in the data processing system 1; FIG. 3 shows a filter engine 110 used in the page mover shown in FIG. 2; and FIG. 4 shows an aggregation engine 120 used in the page mover shown in FIG. 2. FIGS. 9 to 12 show different implementations of data filtering and data aggregation operations performed by the page mover 50, in accordance with an embodiment of the present invention.

Referring to FIGS. 1 to 4, the shown embodiment of the data processing system 1 comprises multiple processors 10, 20, 30 with a hierarchical cache structure comprising multiple levels of cache L1, L2, L3, L4 between the processors 10, 20, 30, a main memory 60 and at least one page mover 50, here two page movers 50 are used. In the shown embodiment four levels of cache L1, L2, L3, L4 are used and cache memories at a second cache level L2, a third cache level L3 and a fourth cache level are shared between the processors 10, 20, 30. The at least one page mover 50 is connected to the cache memories of the different shared cache levels L2, L3, L4, to the main memory 60 and to the multiple processors 10, 20, 30 to move data between the cache memories of the shared cache levels L2, L3, L4, the main memory 60 and the processors 10, 20, 30. Each page mover 50 is positioned closer to the main memory 60 as the processors 10, 20, 30. In response to a request from one of the processors 10, 20, 30 the corresponding page mover 50 fetches data of a storage area line-wise from the cache memories of the shared cache levels L2, L3, L4 or the main memory 60 maintaining multiple processor cache memory access coherency. Each page mover 50 comprises a data processing engine 100 (FIG. 2) which performs at least one of the following data processing operations: aggregation and filtering of the fetched data; and each page mover 50 moves processed data to the cache memories of the shared cache levels L2, L3, L4 and/or to the main memory 60 and/or to the requesting processor 10, 20, 30 maintaining multiple processor cache memory access coherency.

Referring to FIG. 2, each page mover 50 further comprises a data fetch functionality 52 performing the above mentioned data fetch process, a standard data moving functionality 56 for moving data blocks from one memory location to another memory location, a multiplexer 58 multiplexing the output data of the data processing engine 100 and the standard data moving functionality 54 to a result store functionality 54 performing the above mentioned data store process.

Referring to FIGS. 2 to 4, the data processing engine 100 comprises at least one filter engine 110 and at least one aggregation engine 120. The at least one filter engine 110 comprises in the shown embodiment a parallel comparing unit 111 (FIG. 3), a mask buffer 112 holding data to be written to a corresponding mask store address, an incrementing block 113, a first address buffer 114 holding the next mask store address, a second address buffer 115 holding the next fetch address, a low bound buffer 116, a high bound buffer 117, and a count buffer 118. The at least one filter engine 110 filters data of a storage area line-wise by comparing, e.g., all elements of a fetched line from a source address of the at least one shared cache level L2, L3, L4 and/or the main memory 60 with filter arguments to create results, and writing comparison results to a target storage area located at a target address of the at least one shared cache level L2, L3, L4 and/or the main memory 60 based on a corresponding request from one of the processors 10, 20, 30 containing a filter command with the filter arguments and source and target information. The at least one aggregation engine 110 comprises in the shown embodiment an adder 121 (FIG. 4), a mask buffer 122 holding data read from a corresponding mask fetch address, a result buffer 123, a first address buffer 124 holding the next mask fetch address, and a second address buffer 125 holding the next fetch address. The at least one aggregation engine 120 performs arithmetic or boolean operations with data of at least one storage area of the cache memories of the shared cache levels L2, L3, L4 and/or the main memory 60; and writes the result to at least one storage area of the cache memories of the shared cache levels L2, L3, L4 and/or to the main memory 60 and/or to the requesting processor 10, 20, 30.

Figure 5:
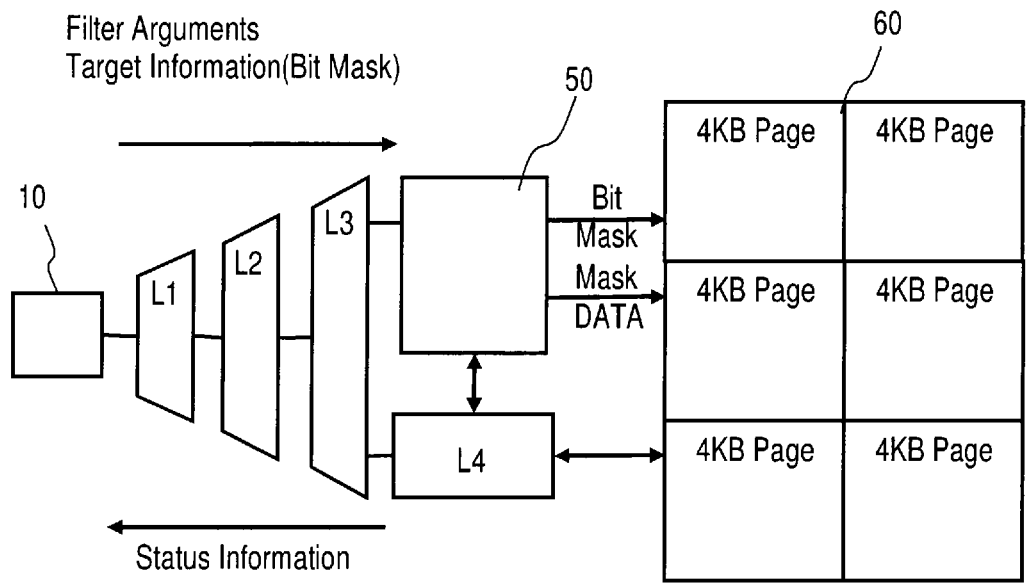
FIGS. 5 to 8 are schematic block diagrams of the data processing system shown in FIG. 1, performing different data filtering and data aggregation operations, in accordance with an embodiment of the present invention.

Referring to FIG. 5, the at least one filter engine 110 of the data mover 50 filters data of a storage area line-wise by comparing, e.g., all elements of a fetched line from a source address of the at least one shared cache level L2, L3, L4 and/or the main memory 60 with filter arguments to create a bitmask (Bit Mask), and writing comparison results as bitmask data (Mask DATA) in a bitmask buffer of a target storage area located at a target address of the at least one shared cache level L2, L3, L4 and/or the main memory 60 based on a corresponding request from one of the processors 10, 20, 30 containing a filter command with the filter arguments and source and target information. In the shown embodiment, status information is provided additionally to the requesting processor 10.

Figure 6:
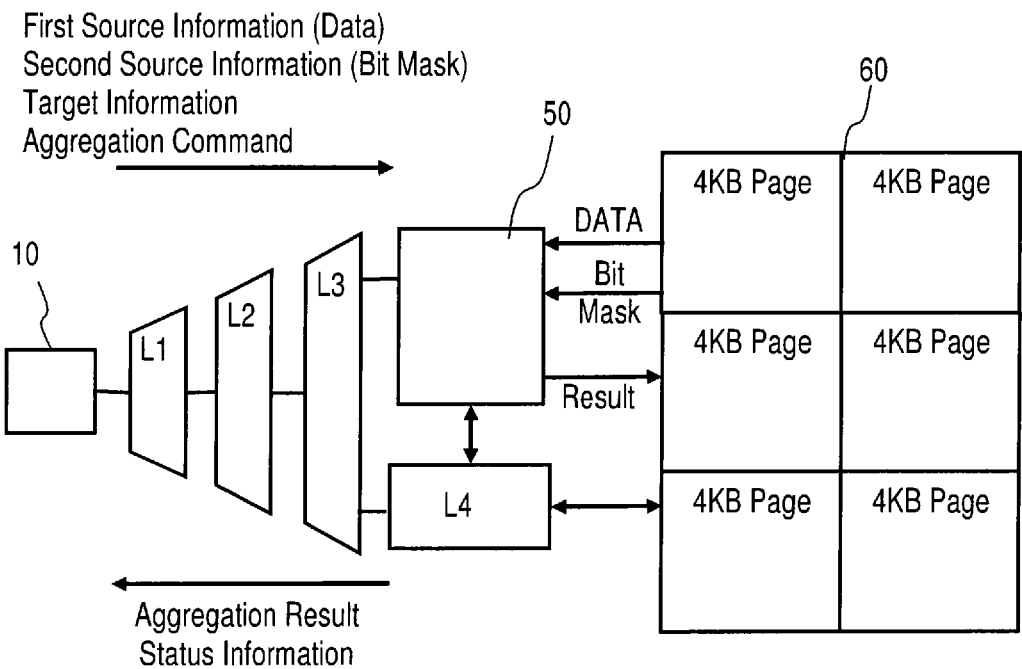

Referring to FIG. 6, the at least one aggregation engine 120 of the data mover 50 performs aggregation operations with data (DATA) of at least one storage area of the at least one shared cache level L2, L3, L4 and/or the main memory 60 having a corresponding bitmask data set (Bit Mask) fetched from a corresponding source address. The data mover 50 sends the aggregation result (Result) to a storage area at a target address of the at least one shared cache level L2, L3, L4 and/or the main memory 60 or to a requesting processor 10 based on a corresponding request from one of the processors 10, 20, 30 containing an aggregation command and bitmask and source and target information. In the shown embodiment, status information is provided additionally to the requesting processor 10.

Figure 7:
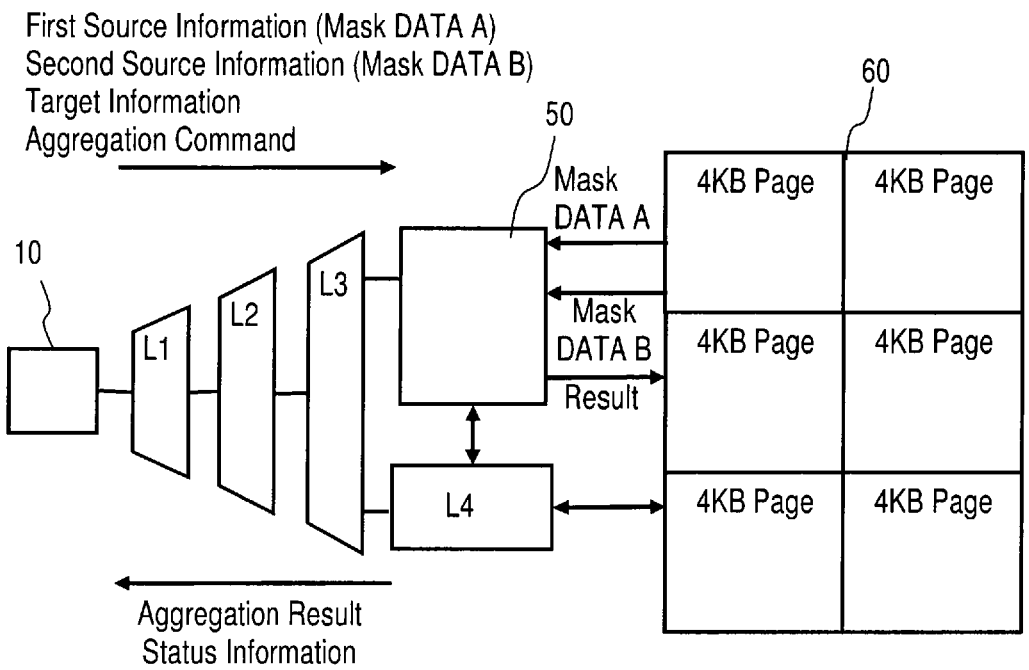

Referring to FIG. 7, the at least one aggregation engine 120 of the data mover 50 performs aggregation operations with data (Mask DATA A) of a first storage area of the at least one shared cache level L2, L3, L4 and/or the main memory 60 having a corresponding first bitmask data set fetched from corresponding source addresses, and data (Mask DATA B) of a second storage area of the at least one shared cache level L2, L3, L4 and/or the main memory 60 having the corresponding bitmask set fetched from corresponding source addresses. The data mover 50 sends the data aggregation result (Result) to a storage area at target addresses of the at least one shared cache level L2, L3, L4 and/or the main memory 60 or to a requesting processor 10 based on a corresponding request from one of the processors 10, 20, 30 containing an aggregation command and bitmask and source and target information. In the shown embodiment, status information is provided additionally to the requesting processor 10.

Figure 8:
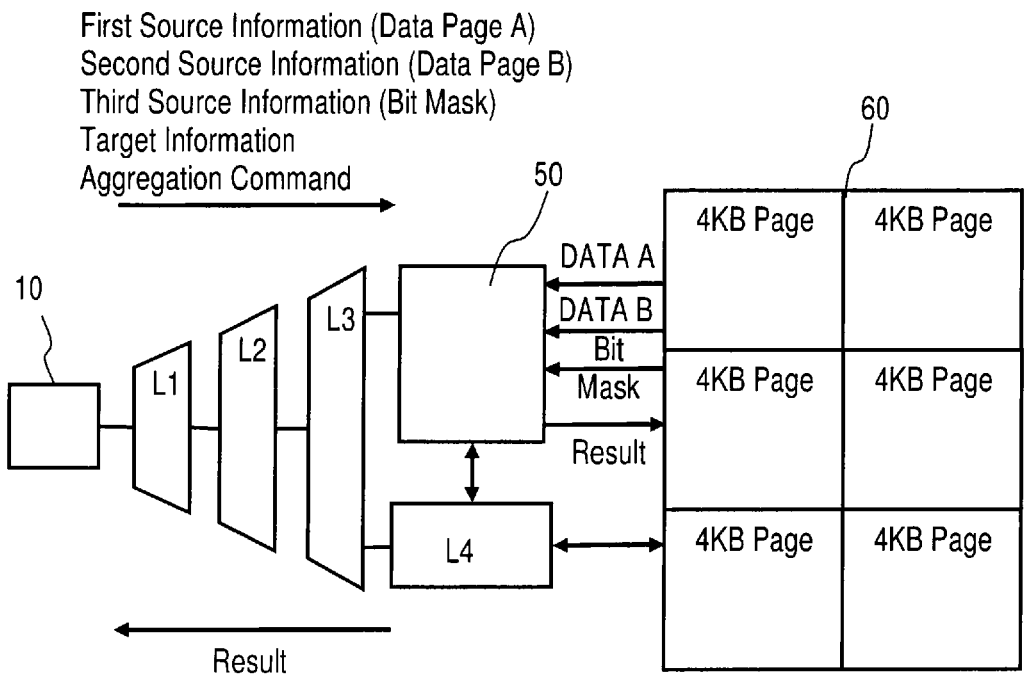

Referring to FIG. 8, the at least one aggregation engine 120 of the data mover 50 performs aggregation operations with data (DATA A) of a first storage area of the at least one shared cache level L2, L3, L4 and/or the main memory 60 fetched from corresponding source addresses, and data (DATA B) of a second storage area of the at least one shared cache level L2, L3, L4 and/or the main memory 60 fetched from corresponding source addresses, according to a corresponding bitmask set (Bit Mask) fetched from corresponding source addresses of a storage area of the at least one shared cache level L2, L3, L4 and/or the main memory 60. The data mover 50 sends the data aggregation result (Result) to a storage area at target addresses of the at least one shared cache level L2, L3, L4 and/or the main memory 60 or to a requesting processor 10 based on a corresponding request from one of the processors 10, 20, 30 containing an aggregation command and bitmask and source and target information. In the shown embodiment, status information is provided additionally to the requesting processor 10.

Figure 9:
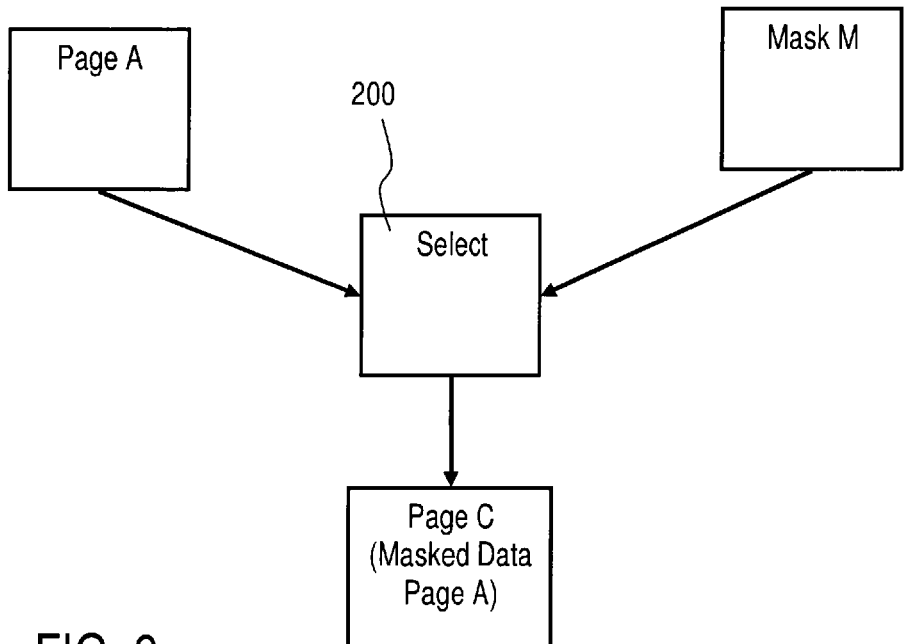
FIGS. 9 to 12 are schematic block diagrams showing different implementations of data filtering and data aggregation operations performed by the page mover shown in FIG. 2, in accordance with an embodiment of the present invention.

Referring to FIG. 9, the at least one filter engine 110 of the data mover 50 performs a select and move operation 200 and selects data (Page A) of a storage area corresponding with bitmask data (Mask M) of the bitmask buffer line-wise from a source address and moves the data to a target address (Page C) to create masked data of page A based on a corresponding request from one of the processors 10, 20, 30 containing a move command and bitmask and source and target information.

Figure 10:
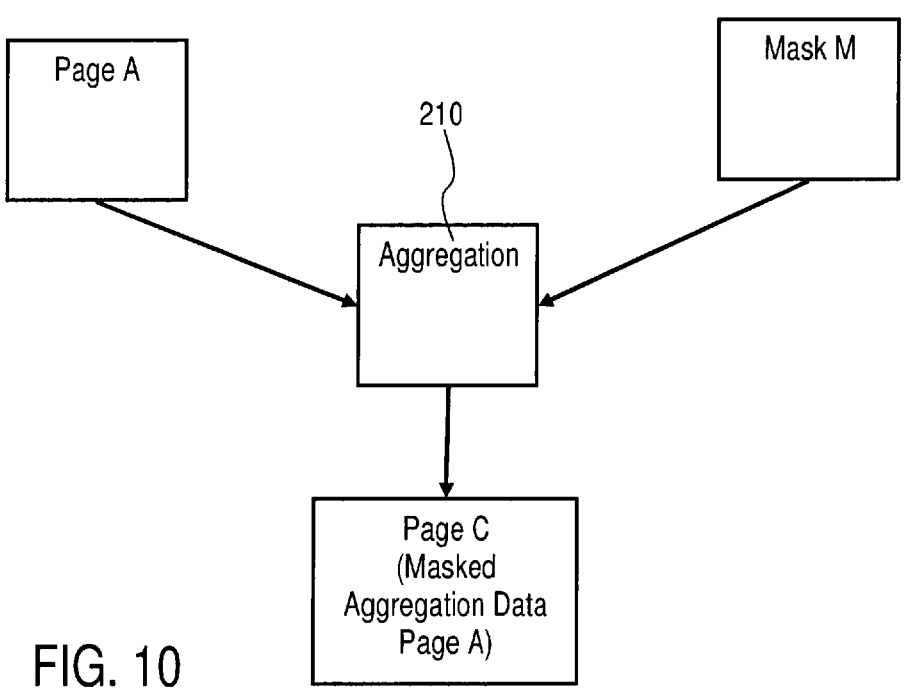

Referring to FIG. 10, the at least one aggregation engine 110 of the data mover 50 aggregates data (Page A) of a storage area from a source address according to bitmask data (Mask M) of the bitmask buffer line-wise to a target address (Page C) to create masked aggregation data of page A based on a corresponding request from one of the processors 10, 20, 30 containing a move command, an aggregation command and bitmask and source and target information.

Figure 11:
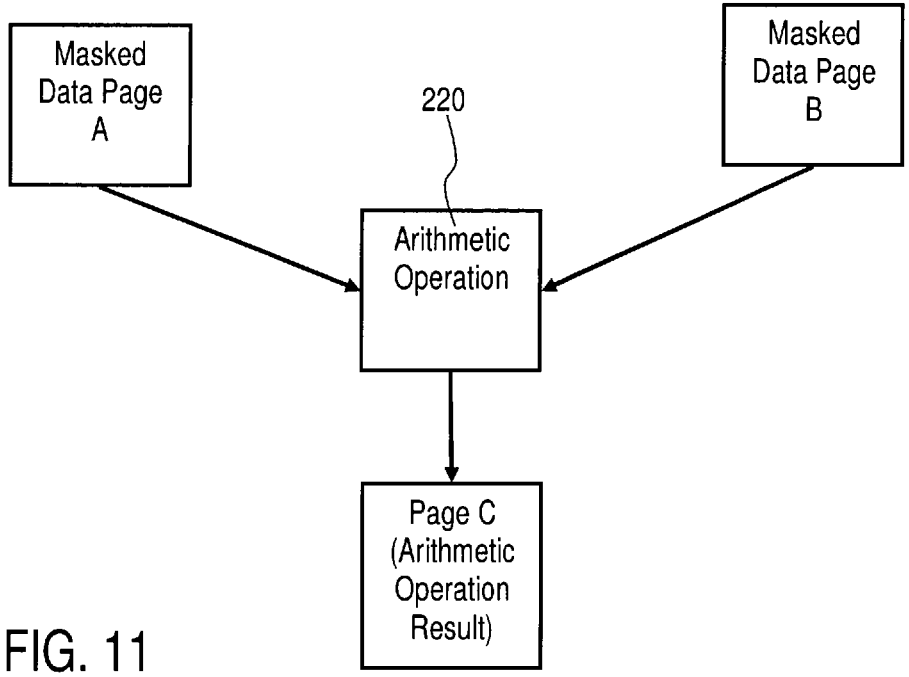

Referring to FIG. 11, the at least one aggregation engine 110 of the data mover 50 performs line-wise arithmetic operations 220 with masked data (Masked Data Page A) of a first page from a source address of a storage area and with masked data (Masked Data Page B) of a second page from a source address of a storage area and writes the result (Arithmetic Operation Result) of the arithmetic operations 220 to a storage area of a target address (Page C) based on a corresponding request from one of the processors 10, 20, 30 containing an aggregation command and source and target information.

Figure 12:
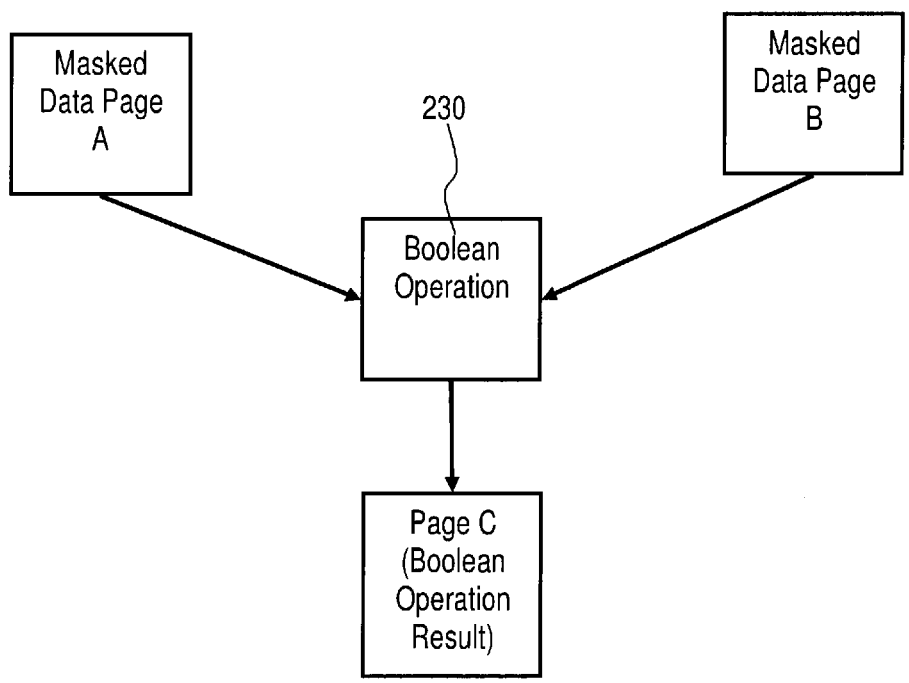

Referring to FIG. 12, the at least one aggregation engine 110 of the data mover 50 performs line-wise boolean operations 230 with masked data (Masked Data Page A) of a first page from a source address of a storage area and with masked data (Masked Data Page B) from a source address of a second page of a storage area and writes the result (Boolean Operation Result) of the boolean operations 230 to a storage area of a target address (Page C) based on a corresponding request from one of the processors 10, 20, 30 containing an aggregation command and source and target information.

Figure 13:
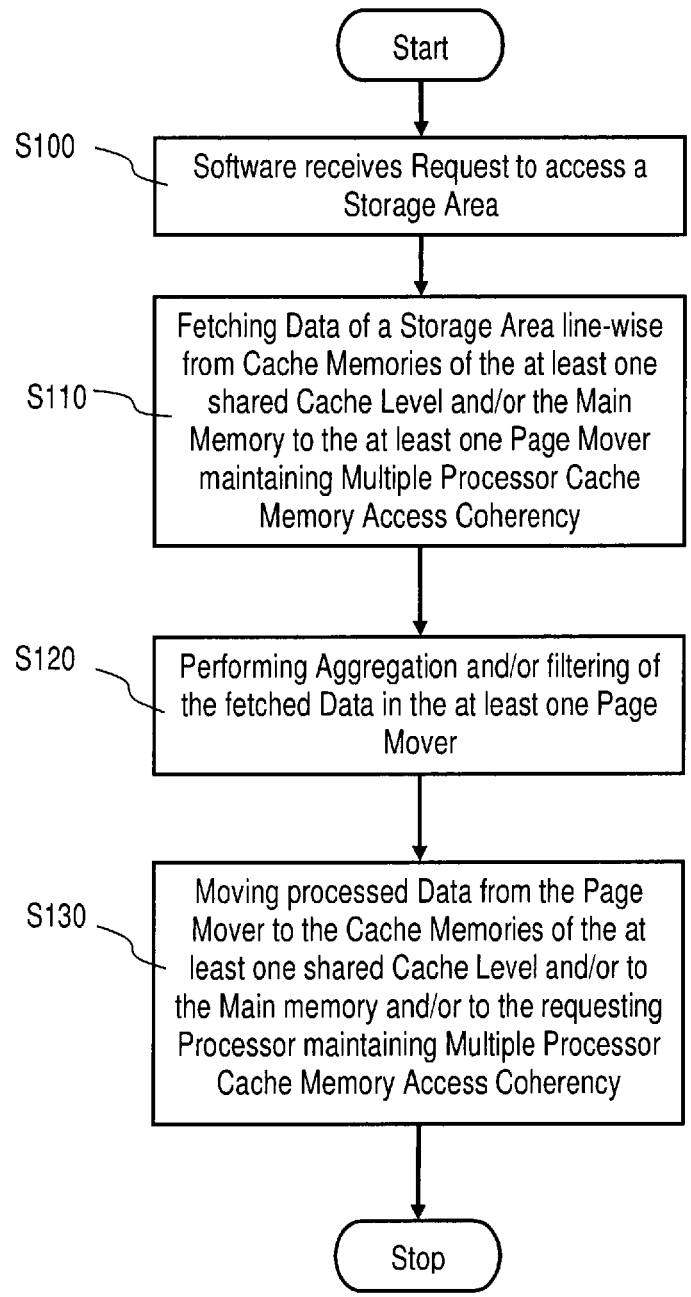
FIG. 13 is a schematic flow diagram of a method for data processing in a multiple processor system, in accordance with an embodiment of the present invention.
Figure 14:
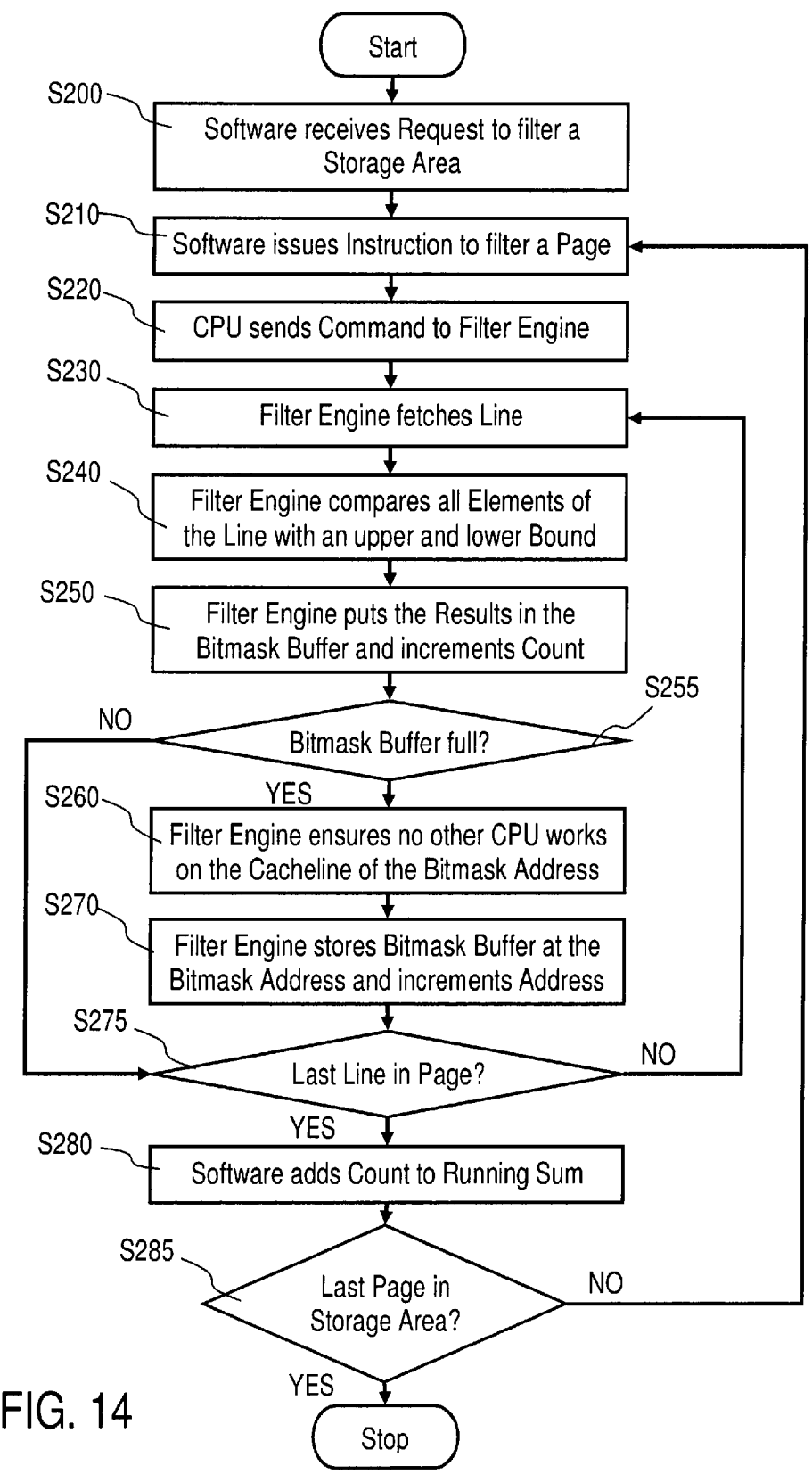
FIG. 14 is a schematic flow diagram of a data filtering operation performed by the page mover shown in FIG. 2, in accordance with an embodiment of the present invention.
Figure 15:
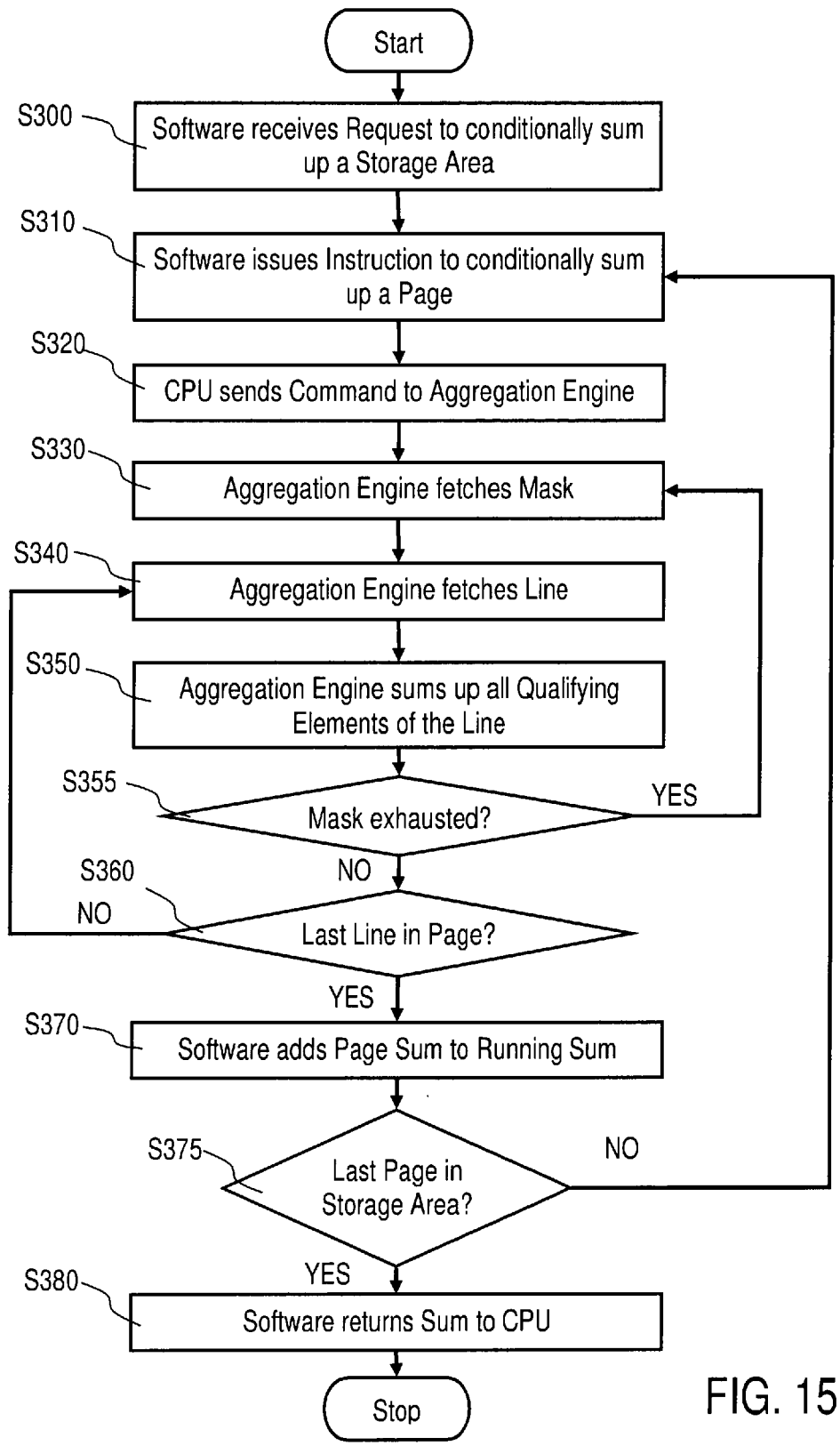
FIG. 15 is a more detailed flow diagram of a masked summing operation performed by the page mover shown in FIG. 2, in accordance with an embodiment of the present invention.
Figure 16:
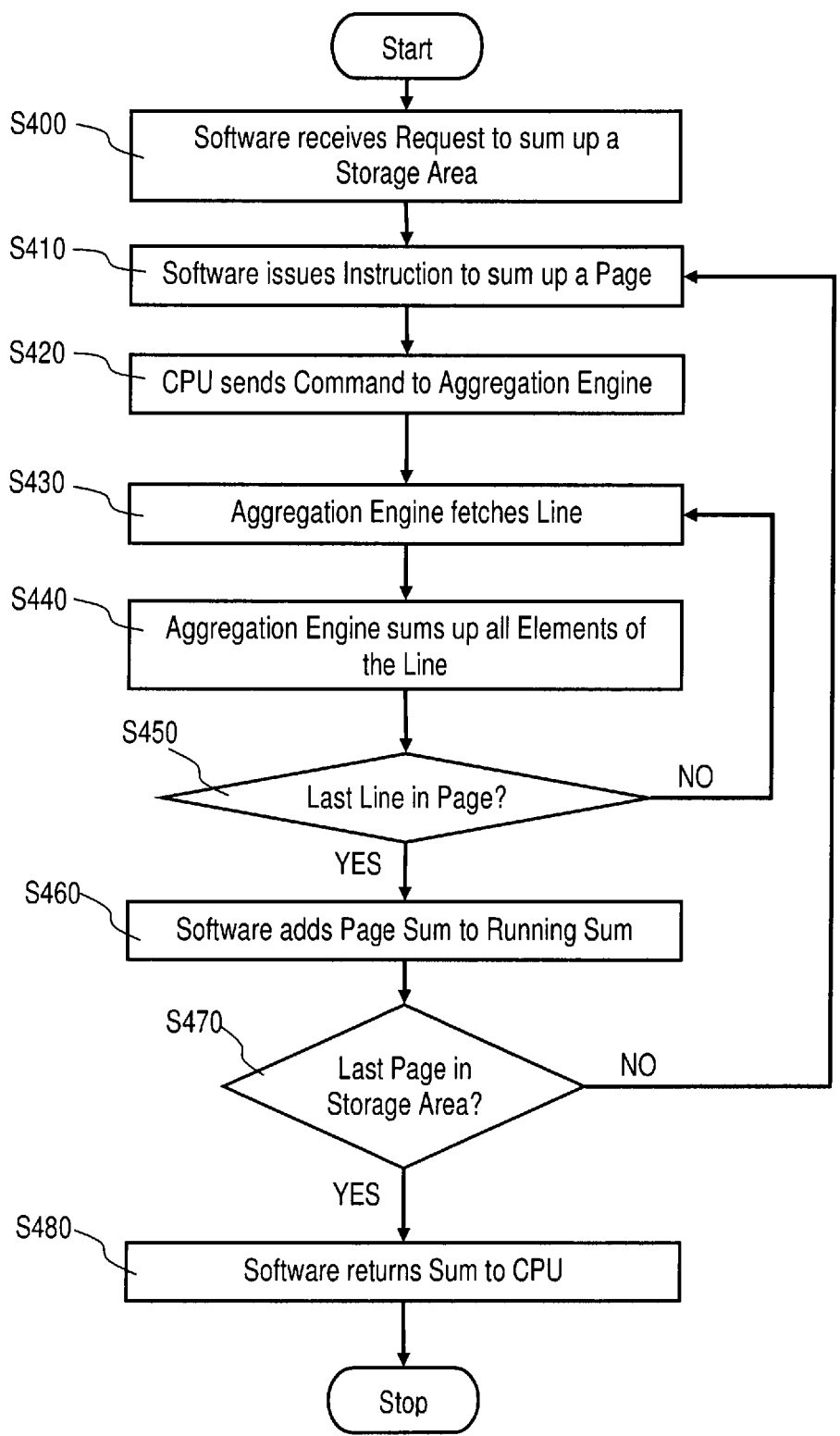
FIG. 16 is a more detailed flow diagram of a summing operation performed by the page mover shown in FIG. 2, in accordance with an embodiment of the present invention.

FIG. 13 shows a method for data processing in a multiple processor system 1, in accordance with an embodiment of the present invention; FIG. 14 shows a data filtering operation, in accordance with an embodiment of the present invention; FIG. 15 shows a masked summing operation, in accordance with an embodiment of the present invention; and FIG. 16 shows a summing operation, in accordance with an embodiment of the present invention.

Referring to FIG. 13, in step S100 software of the page mover 50 receives a request to access a storage area. In step S110 data of the storage area is fetched line-wise from cache memories of the at least one shared cache level L2, L3, L4 and/or the main memory 60 to the at least one page mover 50 maintaining multiple processor cache memory access coherency. In step S120 aggregation and/or filtering of the fetched data is performed in the at least one page mover 50. In step S130 the processed data is moved from the page mover to the cache memories of the at least one shared cache level L2, L3, L4 and/or the main memory 60 and/or to the requesting processor 10, 20, 30 maintaining multiple processor cache memory access coherency.

Referring to FIG. 14, in step S200 software of the data processing system 1 receives a request to filter a storage area. In step S210, the software of the data processing system 1 issues an instruction to filter a page to one of the processors 10, 20, 30. In step S220 the corresponding processor 10, 20, 30 sends a filter command to the filter engine 110 of the corresponding page mover 50. In step S230, the filter engine 110 fetches a line from the corresponding storage area. In step S240 the filter engine 110, e.g., compares all elements of the line with an upper and lower bound. In step S250 the filter engine 110 puts the results in the bitmask buffer 112 and increments the count unit 118. In step S255, it is checked, if the bitmask buffer 112 is full. If the bitmask buffer 112 is full, the filter engine 110 ensures in step S260 that no other processor 10, 20, 30 works on the cache-line of the bitmask address. In step S270 the filter engine 110 stores the content of the bitmask buffer 112 at the bitmask address and increments the address. If the bitmask buffer 112 is not full, S255, the process continues directly with step S275. In step S275 it is checked, if the last line of the page is reached. If not, the process repeats steps S230 to S275. If yes, the software adds the current count value to a running sum in step S280. In step S285 it is checked, if the last page in the storage area is reached. If not, the process repeats steps S210 to S285. If yes, the process ends.

Referring to FIG. 15, in step S300 software of the data processing system 1 receives a request to conditionally sum up a storage area. In step S310, the software of the data processing system 1 issues an instruction to conditionally sum up a page to one of the processors 10, 20, 30. In step S320 the corresponding processor 10, 20, 30 sends a conditionally sum up command to the aggregation engine 120 of the corresponding page mover 50. In step S330, the aggregation engine 120 fetches a mask from the corresponding storage area to the bitmask buffer 122. In step S340 the aggregation engine 120 fetches a line of the corresponding page. In step S350 the aggregation engine 120 sums up, e.g., all qualifying elements of the line based on the mask in the bitmask buffer 122. In step S355, it is checked, if the mask in the bitmask buffer 122 is exhausted. If the mask in the bitmask buffer 122 is exhausted, the aggregation engine 120 repeats steps S330 to S355. If not, the process continues with step S360. In step S360 it is checked, if the last line of the page is reached. If not, the process repeats steps S340 to S360. If yes, the software adds the current page sum to a running sum in step S370. In step S375 it is checked, if the last page in the storage area is reached. If not, the process repeats steps S310 to S375. If yes, the software returns the sum to the requesting processor 10, 20, 30 in step S380 and the process ends.

Referring to FIG. 16, in step S400 software of the data processing system 1 receives a request to sum up a storage area. In step S410, the software of the data processing system 1 issues an instruction to sum up a page to one of the processors 10, 20, 30. In step S420 the corresponding processor 10, 20, 30 sends a sum up command to the aggregation engine 120 of the corresponding page mover 50. In step S430, the aggregation engine 120 fetches a line of the corresponding page. In step S440 the aggregation engine 120 sums up, e.g., all elements of the line. In step S450, it is checked, if the last line of the page is reached. If not, the process repeats steps S430 to S450. If yes, the software adds the current page sum to a running sum in step S460. In step S470 it is checked, if the last page in the storage area is reached. If not, the process repeats steps S410 to S470. If yes, the software returns the sum to the requesting processor 10, 20, 30 in step S480 and the process ends.

As described herein, in an embodiment of the present invention, a data processing system comprises multiple processors with a hierarchical cache structure comprising multiple levels of cache and a main memory. At least cache memories of one cache level are shared between the processors. Further, at least one page mover is positioned closer to the main memory and connected to the cache memories of the at least one shared cache level, the main memory and to the multiple processors to move data between the cache memories of the at least one shared cache level, the main memory and the processors. In response to a request from one of the processors the at least one page mover fetches data of a storage area line-wise from at least one of the following memories: the cache memories of the at least one shared cache level and the main memory maintaining multiple processor cache memory access coherency; wherein the at least one page mover comprises a data processing engine which performs at least one of the following data processing operations: aggregation and filtering of the fetched data. The page mover moves processed data to at least one of the following components: cache memories of the at least one shared cache level, the main memory and the requesting processor maintaining multiple processor cache memory access coherency.

In further embodiments of the present invention, the data processing engine comprises at least one filter engine filtering data of a storage area line-wise by comparing all elements of a fetched line from a source address of the at least one shared cache level and/or the main memory with filter arguments to create a bitmask, and writing comparison results as bitmask data in a bitmask buffer of a target storage area located at a target address of the at least one shared cache level and/or the main memory based on a corresponding request from one of the processors containing a filter command with the filter arguments and source and target information.

In further embodiments of the present invention, the data processing engine comprises at least one filter engine moving data of a storage area corresponding with bitmask data of the bitmask buffer line-wise from a source address to a target address to create a bitmask data set based on a corresponding request from one of the processors containing a move command and bitmask and source and target information.

In further embodiments of the present invention, the data processing engine comprises at least one aggregation engine performing arithmetic or boolean operations with data of at least one storage area fetched from a corresponding source address having a corresponding bitmask data set and sending a data processing result to a storage area at a target address of the at least one shared cache level and/or the main memory or to a requesting processor based on a corresponding request from one of the processors containing an aggregation command and bitmask and source and target information.

In further embodiments of the present invention, at least one aggregation engine performs arithmetic or boolean operations with data of a first storage area fetched from corresponding source addresses having a corresponding first bitmask data set, and data of a second storage area fetched from corresponding source addresses having the corresponding bitmask set, and sends a data processing result to a storage area at target addresses of the at least one shared cache level and/or the main memory or to a requesting processor based on a corresponding request from one of the processors containing an aggregation command and bitmask and source and target information.

In another embodiment of the present invention, a method for data processing in a multiple processor system with a hierarchical cache structure comprising multiple levels of cache between the processors and a main memory, wherein at least cache memories of one cache level are shared between the processors and at least one page mover is positioned closer to the main memory and connected to the cache memories of the at least one shared cache level, the main memory and to the multiple processors to move data between the cache memories of the at least one shared cache level, the main memory and the processors; wherein in response to a request from one of the processors the method performs the steps of: fetching data of a storage area line-wise from at least one of the following memories: the cache memories of the at least one shared cache level and the main memory; to the at least one page mover maintaining multiple processor cache memory access coherency; performing at least one of the following data processing operations in the at least one page mover: aggregation and filtering of the fetched data; and moving processed data from the page mover to at least one of the following components: cache memories of the at least one shared cache level, the main memory and the requesting processor maintaining multiple processor cache memory access coherency.

In further embodiments of the present invention, data of a storage area is moved line-wise from a source address of the at least one shared cache level and/or the main memory to a target address of the at least one shared cache level and/or the main memory based on a corresponding request from one of the processors containing a move command and source and target information.

In further embodiments of the present invention, based on a corresponding request from one of the processors containing a filter command with the filter arguments and source and target information data of a storage area are filtered line-wise by comparing all elements of a fetched line from a source address of the at least one shared cache level and/or the main memory with filter arguments, wherein comparison results are written in a bitmask buffer located at a target address of the at least one shared cache level and/or the main memory.

In further embodiments of the present invention, based on a corresponding request from one of the processors containing an aggregation command and source and target information arithmetic or boolean operations are performed with data of at least one storage area fetched from a corresponding source address of the at least one shared cache level and/or the main memory, wherein a data processing result is sent to a storage area at a target address of the at least one shared cache level and/or the main memory or to a requesting processor.

In further embodiments of the present invention, at least one aggregation engine performs arithmetic or boolean operations with data of a first storage area and a masked or unmasked second storage area fetched from corresponding source addresses of the at least one shared cache level and/or the main memory.

In another embodiment of the present invention, a data processing program for execution in a data processing system comprises software code portions for performing a method for data processing in a multiple processor system when the program is run on the data processing system.

In yet another embodiment of the present invention, a computer program product stored on a computer-usable medium, comprises computer-readable program means for causing a computer to perform a method for data processing in a multiple processor system when the program is run on the computer.

All in all, embodiments of the present invention are focused on a page mover functionality comprising a data processing engine connected to the shared processor cache and each processor to aggregate and/or filter data from the shared processor cache in response to a request from one of the processors.

One aspect of the innovation is to perform specific operations like filtering and/or aggregation operations closer to the memory. This is suitable to increase payload for online analytical processing (OLAP) in business environments.

Embodiments of the present invention interpret a page of memory data as a vector of 8, 16, 32 or 64 bit scalars, for example; and aggregate (sum, min, max) such a vector and return the result in a register. Further embodiments of the present invention create bit masks (filters) by comparing vector elements against register contents passed to the page mover functionality.

Embodiments of the present invention read and interpret a page of memory as a vector of 8, 16, 32 or 64 bit scalars, read one or two 256 bytes cache lines and interpret them as a bit vector, and aggregate (sum, min, max) data under mask and return the result in a register The above, as well as additional purposes, features, and advantages of the present invention are apparent in the detailed written description.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data processing system comprising:
    at least one page mover positioned closer to a main memory of multiple processors and is connected to cache memories of at least one cache level shared between the multiple processors, the main memory and to multiple processors to move data between the cache memories of the at least one cache level, the main memory and the multiple processors, wherein in response to a request from one requesting processor of the multiple processors, the at least one page mover fetches data of a storage area line-wise from at least one of the following memories: the cache memories of the at least one cache level or the main memory maintaining multiple processor cache memory access coherency;
    wherein the at least one page mover comprises a data processing engine which performs filtering of the fetched data, wherein the data processing engine comprises at least one filter engine to filter data of a storage area line-wise by comparing elements of a fetched line from a source address of one or more of the at least one cache level or the main memory with filter arguments to create a bitmask, and to write comparison results as bitmask data in a bitmask buffer of a target storage area located at a target address of one or more of the at least one cache level or the main memory based on a corresponding request from one processor of the multiple processors containing a filter command with the filter arguments and source and target information; and
    wherein the page mover moves processed data to at least one of the following components: cache memories of the at least one cache level, the main memory or the requesting processor maintaining multiple processor cache memory access coherency.

2. The data processing system according to claim 1, wherein said data processing engine comprises at least one filter engine to move data of a storage area corresponding with bitmask data of said bitmask buffer line-wise from a source address to a target address to create a bitmask data set based on a corresponding request from one processor of said multiple processors containing a move command and bitmask and source and target information.

3. The data processing system according to claim 2, wherein the at least one page mover comprises a data processing engine which performs aggregation of the fetched data, and wherein the data processing engine comprises at least one aggregation engine to perform arithmetic or boolean operations with data of at least one storage area fetched from a corresponding source address having a corresponding bitmask data set and to send a data processing result to a storage area at a target address of the one or more of the at least one cache level or the main memory or to a requesting processor based on a corresponding request from one processor of the multiple processors containing an aggregation command and bitmask and source and target information.

4. The data processing system according to claim 2, wherein the at least one page mover comprises a data processing engine which performs aggregation of the fetched data, and wherein the data processing engine comprises at least one aggregation engine to perform arithmetic or boolean operations with data of a first storage area fetched from corresponding source addresses having a corresponding first bitmask data set, and data of a second storage area fetched from corresponding source addresses having said corresponding bitmask set, and to send a data processing result to a storage area at target addresses of one or more of said at least one cache level or said main memory or to a requesting processor based on a corresponding request from one processor of said multiple processors containing an aggregation command and bitmask and source and target information.

5. A method of data processing in a multiple processor system with a hierarchical cache structure comprising multiple levels of cache between multiple processors and a main memory of the multiple processors, wherein at least cache memories of one cache level are shared between said multiple processors, said method comprising:
    based on a request from one processor of said multiple processors, fetching data of a storage area line-wise from at least one of the following memories: said cache memories of said at least one cache level or said main memory to at least one page mover maintaining multiple processor cache memory access coherency;
    performing data processing operations comprising filtering of said fetched data in the at least one page mover, said at least one page mover positioned closer to said main memory and connected to said cache memories of said at least one cache level, said main memory and to said multiple processors to move data between said cache memories of said at least one cache level, said main memory or said multiple processors, the filtering comprising, based on a request from one processor of said multiple processors containing a filter command with filter arguments and source and target information data of a storage area, filtering line-wise by comparing elements of a fetched line from a source address of said at least one cache level or said main memory with filter arguments, wherein comparison results are written in a bitmask buffer located at a target address of said at least one cache level or said main memory; and
    moving processed data from said at least one page mover to at least one of the following components: cache memories of said at least one cache level, said main memory or the requesting processor maintaining multiple processor cache memory access coherency.

6. The method according to claim 5, further comprising moving data of a storage area line-wise from a source address of said at least one cache level or said main memory to a target address of said at least one cache level or said main memory based on a corresponding request from one processor of said multiple processors containing a move command and source and target information.

7. The method according to claim 5, the performing data processing operations further comprising aggregating, the aggregating comprising:
    based on a request from one processor of said multiple processors containing an aggregation command and source and target information, performing arithmetic or boolean operations with data of at least one storage area fetched from a corresponding source address of said at least one cache level or said main memory, wherein a data processing result is sent to a storage area at a target address of said at least one cache level or said main memory or to a requesting processor.

8. The method according to claim 7, wherein at least one aggregation engine performs arithmetic or boolean operations with data of a first storage area and a masked or unmasked second storage area fetched from corresponding source addresses of said at least one cache level or said main memory.

9. A computer program product for data processing in a multiple processor system with a hierarchical cache structure comprising multiple levels of cache between multiple processors and a main memory of the multiple processors, wherein at least cache memories of one cache level are shared between said multiple processors, said computer program product comprising:
  a non-transitory computer readable storage medium readable by a processing circuit and storing instructions for execution by the processing circuit for performing a method comprising:
    based on a request from one processor of said multiple processors, fetching data of a storage area line-wise from at least one of the following memories: said cache memories of said at least one cache level or said main memory to at least one page mover maintaining multiple processor cache memory access coherency;
    performing data processing comprising filtering of said fetched data in the at least one page mover, said at least one page mover positioned closer to said main memory and connected to said cache memories of said at least one cache level, said main memory and to said multiple processors to move data between said cache memories of said at least one cache level, said main memory or said multiple processors, the filtering comprising, based on a request from one processor of said multiple processors containing a filter command with filter arguments and source and target information data of a storage area, filtering line-wise by comparing elements of a fetched line from a source address of said at least one cache level or said main memory with filter arguments, wherein comparison results are written in a bitmask buffer located at a target address of said at least one cache level or said main memory; and
    moving processed data from said at least one page mover to at least one of the following components: cache memories of said at least one cache level, said main memory or the requesting processor maintaining multiple processor cache memory access coherency.

10. The computer program product according to claim 9, wherein said method further comprises moving data of a storage area line-wise from a source address of said at least one cache level or said main memory to a target address of said at least one cache level or said main memory based on a corresponding request from one processor of said multiple processors containing a move command and source and target information.

11. The computer program product according to claim 9, the performing data processing operations further comprising aggregating, the aggregating comprising: based on a request from one processor of said multiple processors containing an aggregation command and source and target information, performing arithmetic or boolean operations with data of at least one storage area fetched from a corresponding source address of said at least one cache level or said main memory, wherein a data processing result is sent to a storage area at a target address of said at least one cache level or said main memory or to a requesting processor.

12. The computer program product according to claim 11, wherein at least one aggregation engine performs arithmetic or boolean operations with data of a first storage area and a masked or unmasked second storage area fetched from corresponding source addresses of said at least one cache level or said main memory.

\* \* \* \* \*